US007357231B2

(12) United States Patent
Kim et al.

(10) Patent No.: US 7,357,231 B2
(45) Date of Patent: Apr. 15, 2008

(54) DOOR DAMPER AND ELECTRONIC APPLIANCES HAVING THE SAME

(75) Inventors: Sung Kwang Kim, Ansan-Si (KR); Yu Jeub Ha, Suwon-si (KR); Yun Ic Hwang, Suwon-si (KR); Seok Weon Hong, Yongin-Si (KR); Pung Yeun Cho, Suwon-Si (KR); Kyoung Ho Kim, Suwon-Si (KR); Kil Young Lee, Suwon-Si (KR); Cheol Jin Kim, Suwon-Si (KR); Tae Ho Kim, Hwaseong-Si (KR); Sang Hyun Kang, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 224 days.

(21) Appl. No.: 11/272,744

(22) Filed: Nov. 15, 2005

(65) Prior Publication Data

US 2006/0282982 A1 Dec. 21, 2006

(30) Foreign Application Priority Data

Jun. 10, 2005 (KR) ..................... 10-2005-0049748

(51) Int. Cl.
*F16D 57/00* (2006.01)

(52) U.S. Cl. ..................................................... 188/290

(58) Field of Classification Search ................ 188/290, 188/293, 294, 296; 16/54, 278
See application file for complete search history.

(56) References Cited

U.S. PATENT DOCUMENTS

| | | | | |
|---|---|---|---|---|
| 5,121,521 | A * | 6/1992 | Hagiwara et al. | 16/278 |
| 6,954,221 | B2 * | 10/2005 | Wu | 361/681 |
| 7,155,781 | B2 * | 1/2007 | Yamada et al. | 16/367 |
| 2002/0007993 | A1 * | 1/2002 | Kobori et al. | 188/290 |
| 2002/0179387 | A1 * | 12/2002 | Orita | 188/290 |
| 2005/0193523 | A1 * | 9/2005 | Nam et al. | 16/330 |
| 2005/0252740 | A1 * | 11/2005 | Fukukawa | 188/290 |

FOREIGN PATENT DOCUMENTS

| | | |
|---|---|---|
| KR | 1995-10686 | 9/1995 |
| KR | 10-449590 | 5/2003 |

* cited by examiner

*Primary Examiner*—Chris Schwartz
(74) *Attorney, Agent, or Firm*—Staas & Halsey LLP

(57) ABSTRACT

A door damper. The door damper includes a rotational shaft rotatably coupled to a door, a rotating resistance unit to generate rotating resistance to the rotational shaft, and a latching device latched to the rotational shaft and the door so as to allow the door and the rotational shaft to rotate together in a predetermined region. The latching device includes a free rotating section enabling free rotation of the door at an initial stage of opening the door, and a latching section enabling the latching device to be latched to the rotational shaft and the door at a final stage of opening the door so as to allow the door and the rotational shaft to rotate together. With the door damper, the door of electronic appliances can be smoothly opened without impact, and can be easily closed.

8 Claims, 11 Drawing Sheets

DOOR DAMPER AND ELECTRONIC APPLIANCES HAVING THE SAME

CROSS-REFERENCE TO RELATED APPLICATIONS

This application claims the benefit of Korean Patent Application No. 10-2005-0049748, filed on Jun. 10, 2005 in the Korean Intellectual Property Office, the disclosure of which is incorporated herein its entirety by reference.

BACKGROUND OF THE INVENTION

1. Field of the Invention

The present invention relates to a door damper, and electronic appliances having the same. More particularly, the present invention relates to a door damper, which enables a door to be smoothly opened while relieving impact when the door is opened, and electronic appliances having the same.

2. Description of the Related Art

Generally, electronic appliances such as dish washing machines or microwave ovens have a receiving compartment to receive an object, and a hinged door coupled to a front side of the receiving compartment to open or close the receiving compartment. Since the hinged door is hingably coupled to a body of the appliance via a hinge device, it is advantageous to widely open an entrance of the receiving compartment and to maintain sealing of an opening/closing part after closing the door.

However, such a hinged door has a problem in that, when a user opens the door with great force or opens the door rapidly, an impact can be applied to one side of the hinge device to cause noise, and in some cases, can cause damage to the hinge device. In particular, in the case where the door is opened downwardly as with a typical microwave oven, the problem becomes severe due to the weight of the door. Accordingly, most electronic appliances employing a hinged door are provided with a door damper to relieve the impact occurring when the door is opened.

One example of a door damper is disclosed in Korean Patent No. 1995-10686, entitled “Multi-plate type damper using viscous fluid.” The door damper of the disclosure includes a plurality of movable plates rotatably equipped to a rotational shaft within a casing, a plurality of stationary plates disposed between the movable plates within the casing, and viscous fluid filled between the stationary plates and the movable plates within the casing to generate rotating resistance to the movable plates. The rotational shaft extends to the outside of the casing, and is coupled to the door. This structure can generate rotating resistance to the rotational shaft to relieve an impact occurring when the door is opened or closed.

However, although the door damper of the disclosure can relieve the impact occurring when the door is opened or closed, there is a problem in that, since rotating resistance is continuously applied to the rotational shaft from an initial stage of opening the door to a final stage of completely opening the door, and vice versa, the door cannot be smoothly opened or closed, causing inconvenience.

SUMMARY OF THE INVENTION

The present invention has been made in view of the above and other problems, and an aspect of the present invention is to provide a door damper, which prevents rotating resistance from being applied to a door at an initial stage of opening the door, and then allows rotating resistance to be applied to the door until the door is completely opened, so that the door can be smoothly opened while preventing impact from occurring when the door is opened, and electronic appliances having the same.

It is another aspect of the present invention to provide a door damper, which prevents rotating resistance from being applied to a door when the door is closed, so that the door can be easily closed, and electronic appliances having the same.

Additional aspects and/or advantages of the invention will be set forth in part in the description which follows and, in part, will be apparent from the description, or may be learned by practice of the invention.

In accordance with the present invention, these and/or other aspects are accomplished by providing a door damper to relieve impact occurring when a door is opened, including: a rotational shaft rotatably coupled to the door; a rotating resistance unit to generate rotating resistance to the rotational shaft; and a latching device latched to the rotational shaft and the door so as to allow the door and the rotational shaft to rotate together in a predetermined region, the latching device having a free rotating section enabling free rotation of the door at an initial stage of opening the door, and a latching section enabling the latching device to be latched to the rotational shaft and the door at a final stage of opening the door so as to allow the door and the rotational shaft to rotate together.

The latching device may include a latching protrusion protruding from an outer surface of the rotational shaft, and a latching groove formed on the door to allow the latching protrusion to enter the latching groove and latch to the latching groove, and having a width corresponding to the free rotating section in a rotating direction to allow the free rotation of the door.

The door damper may further include: a bracket coupled to an end of the door and having a shaft engaging hole to engage with the rotational shaft, and a plurality of latching jaws adjacent the shaft engaging hole and formed on an outer surface of the bracket to latch to the latching protrusion, the latching groove having a width corresponding to a separation between the latching jaws.

The latching groove may be formed on an inner surface of the shaft engaging hole formed to the door to engage with the rotational shaft.

The latching device may include a latching groove elongated on an outer surface of the rotational shaft in a rotating direction, and a latching protrusion formed on the door to enter and latch to the latching groove, the latching groove having a length corresponding to the free rotating section in the rotating direction.

The rotating resistance unit may include a cylindrical casing filled with viscous fluid and having the rotational shaft rotatably coupled to a center of the casing, a shielding plate fixed into the casing to radially partition an inner space of the casing, and a compressing plate fixed to the rotational shaft to compress the viscous fluid in the casing while rotating together with the rotational shaft, and extending in a radial direction of the rotational shaft.

The door damper may further include a first flow hole formed in at least one of the shielding plate and the compressing plate to allow the fluid to flow therethrough, and an opening/closing member to open or close the first flow hole so as to allow the free rotation when the rotational shaft rotates in a closing direction of the door while generating rotating resistance to the rotational shaft when the rotational shaft rotates in an opening direction of the door.

The door damper may further include a second flow hole formed in at least one of the shielding plate and the compressing plate to allow the fluid to flow therethrough.

In accordance with another aspect, an electronic appliance including a body having a receiving compartment defined therein, a door to open or close the receiving compartment, and a door damper to relieve impact when the door is opened, where the door damper includes: a rotational shaft rotatably coupled to the door; a rotating resistance unit to generate rotating resistance to the rotational shaft; and a latching device latched to the rotational shaft and the door so as to allow the door and the rotational shaft to rotate together in a predetermined region, the latching device having a free rotating section enabling free rotation of the door at an initial stage of opening the door, and a latching section enabling the latching device to be latched to the rotational shaft and the door at a final stage of opening the door so as to allow the door and the rotational shaft to rotate together.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION OF THE PREFERRED EMBODIMENTS

Figure 1:
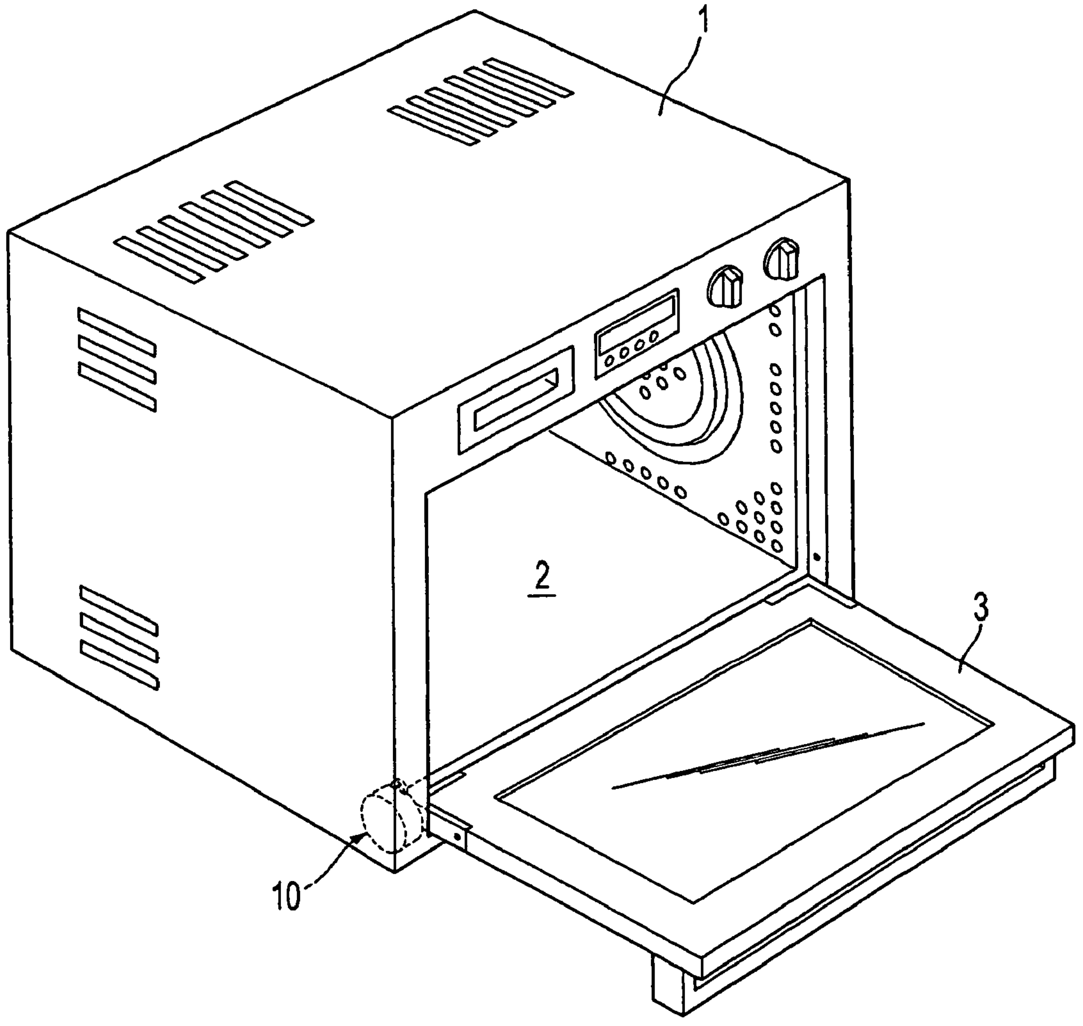
FIG. 1 is a perspective view illustrating an electronic appliance having a door damper in accordance with the present invention.

Reference will now be made in detail to the embodiments of the present invention, examples of which are illustrated in the accompanying drawings, in which like reference numerals denotes like elements throughout.

In FIG. 1, a typical microwave oven is shown as an electronic appliance having a door damper according to the invention. The microwave oven includes a body 1 having a receiving compartment 2 defined therein, where foods are cooked, and a door 3 hingably mounted at a front side of the body 1 to open and close the receiving compartment 2 while hinging up and down. The door 3 is hingably coupled to both lower ends of the body via a door damper 10 contained in the microwave oven.

Figure 2:
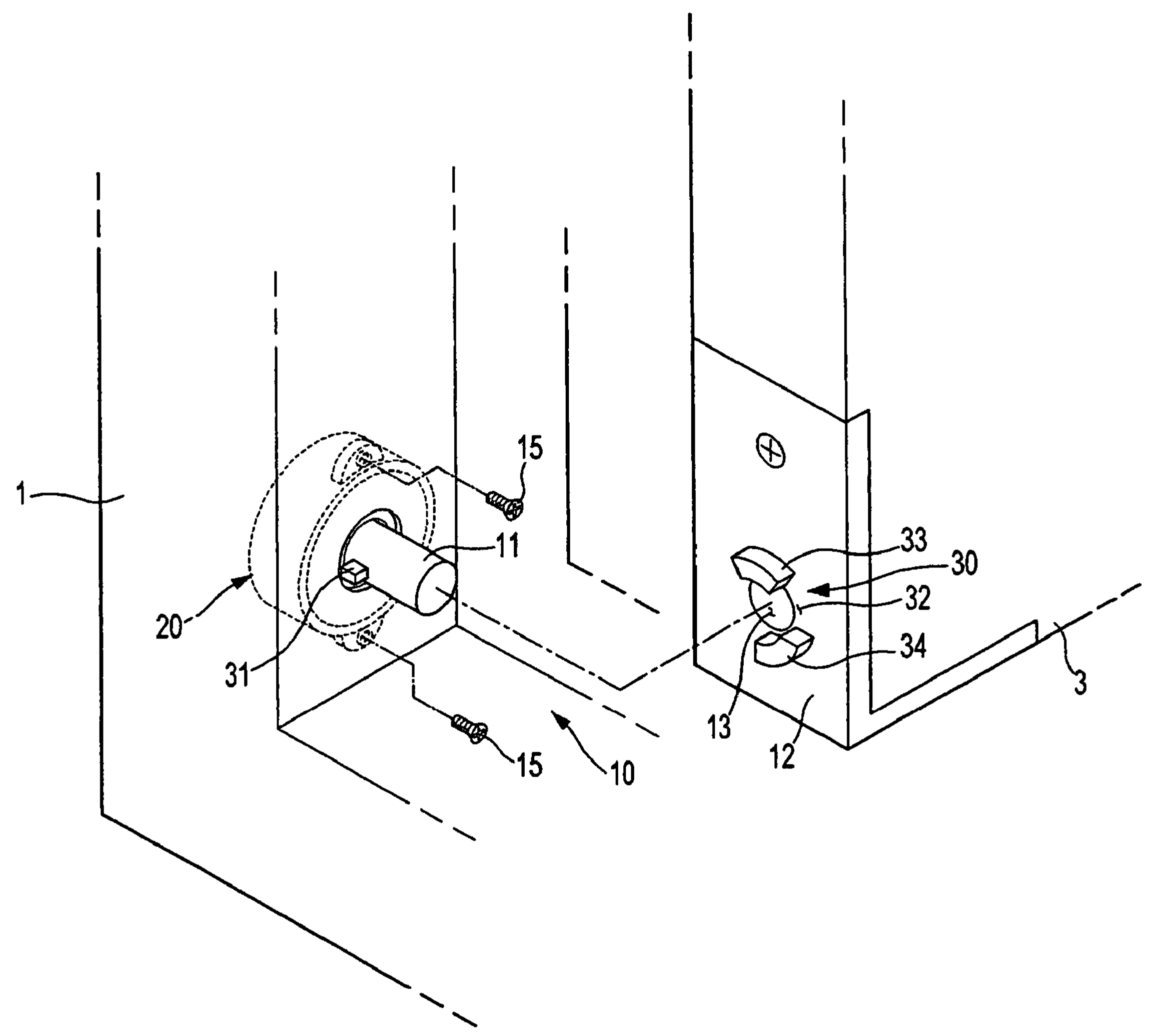
FIG. 2 is a perspective view illustrating the construction of a door damper in accordance with one embodiment of the present invention.
Figure 3:
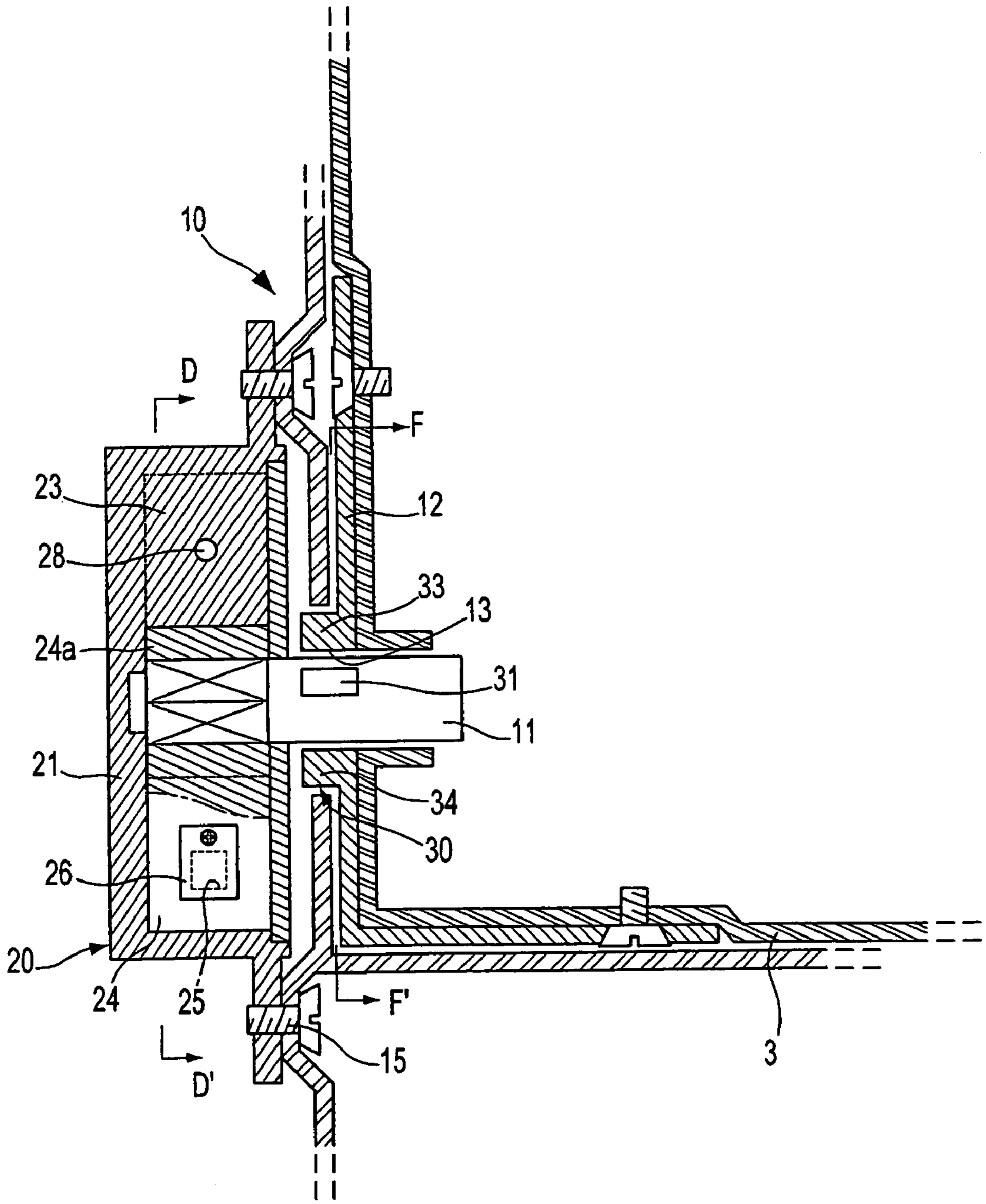
FIG. 3 is a cross-sectional view illustrating the construction of the door damper in accordance with the present invention.

As shown in FIGS. 2 and 3, the door damper 10 serves to rotatably hold the door 3 while relieving impact occurring when the door 3 is opened. The door damper 10 includes a rotational shaft 11 rotatably coupled to the door 3, a bracket 12 coupled to a lower portion of either side of the door 3 and having a shaft engaging hole 13 to engage with the rotational shaft 11, and a rotating resistance unit 20 coupled to the rotational shaft 11 to generate rotating resistance to the rotational shaft 11 while being fixed at either side of the body 1. The door damper 10 further includes a latching device 30 provided at a connecting portion of the rotational shaft 11 and the door 3 to allow the door 3 and the rotational shaft 11 to rotate together in a predetermined region while the door 3 is opened, thereby relieving the impact.

Figure 4:
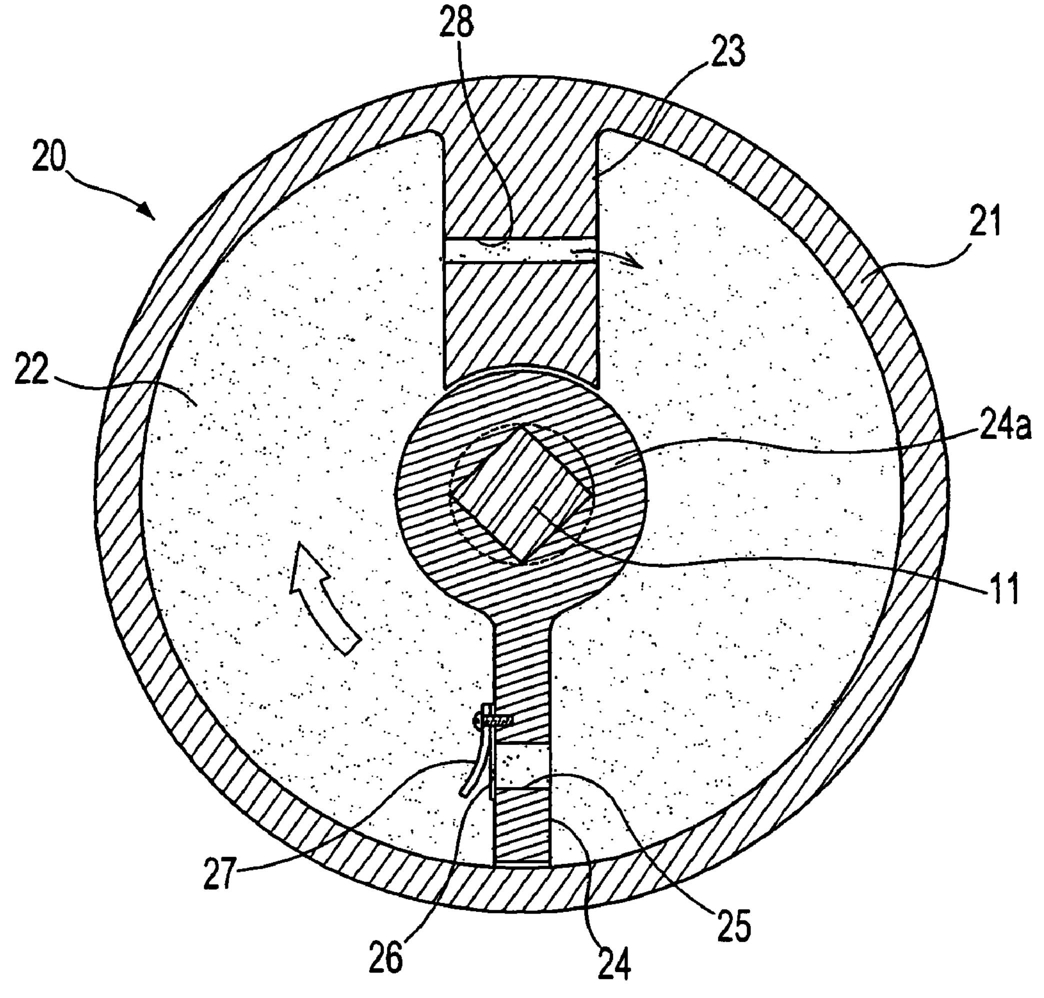
FIG. 4 is a cross-sectional view taken along line D-D' of FIG. 3, illustrating a rotating resistance unit while a door is opened.

The rotating resistance unit 20 is fixed to the body 1 by screws 15. As shown in FIGS. 3 and 4, the rotating resistance unit 20 includes a cylindrical casing 21 filled with viscous fluid 22 and having the rotational shaft 11 rotatably coupled to the center of the casing 21, and a shielding plate 23 fixed into the casing 21 to radially partition an inner space of the casing 21. The rotating resistance unit 20 further includes a compressing plate 24 fixed to the rotational shaft 11 to compress the viscous fluid 22 in the casing 21 while rotating together with the rotational shaft 11.

The compressing plate 24 includes a hub 24a fixed to an outer surface of the rotational shaft 11. The compressing plate 24 radially extends from the rotational shaft 11 to generate rotating resistance to the rotational shaft 11 by compressing the viscous fluid 22. The compressing plate 24 has a length corresponding to an inner radius of the casing 21 and a width corresponding to an inner width of the casing 21. The compressing plate 24 is formed with a first flow hole 25 through which the fluid flows, and which has an opening/closing member 26 to open or close the first flow hole 25. The opening/closing member 26 is equipped at one side of the outer surface of the compressing plate 24 to cover the first flow hole 25 in order to allow the fluid to flow only in one direction, and is composed of an elastic metal sheet. The opening/closing member 26 is protected by a protection member 27 equipped at an outer surface of the opening/closing member 26 to prevent excessive bending of the opening/closing member 26 while the opening/closing member 26 opens or closes the first flow hole 25.

Figure 5:
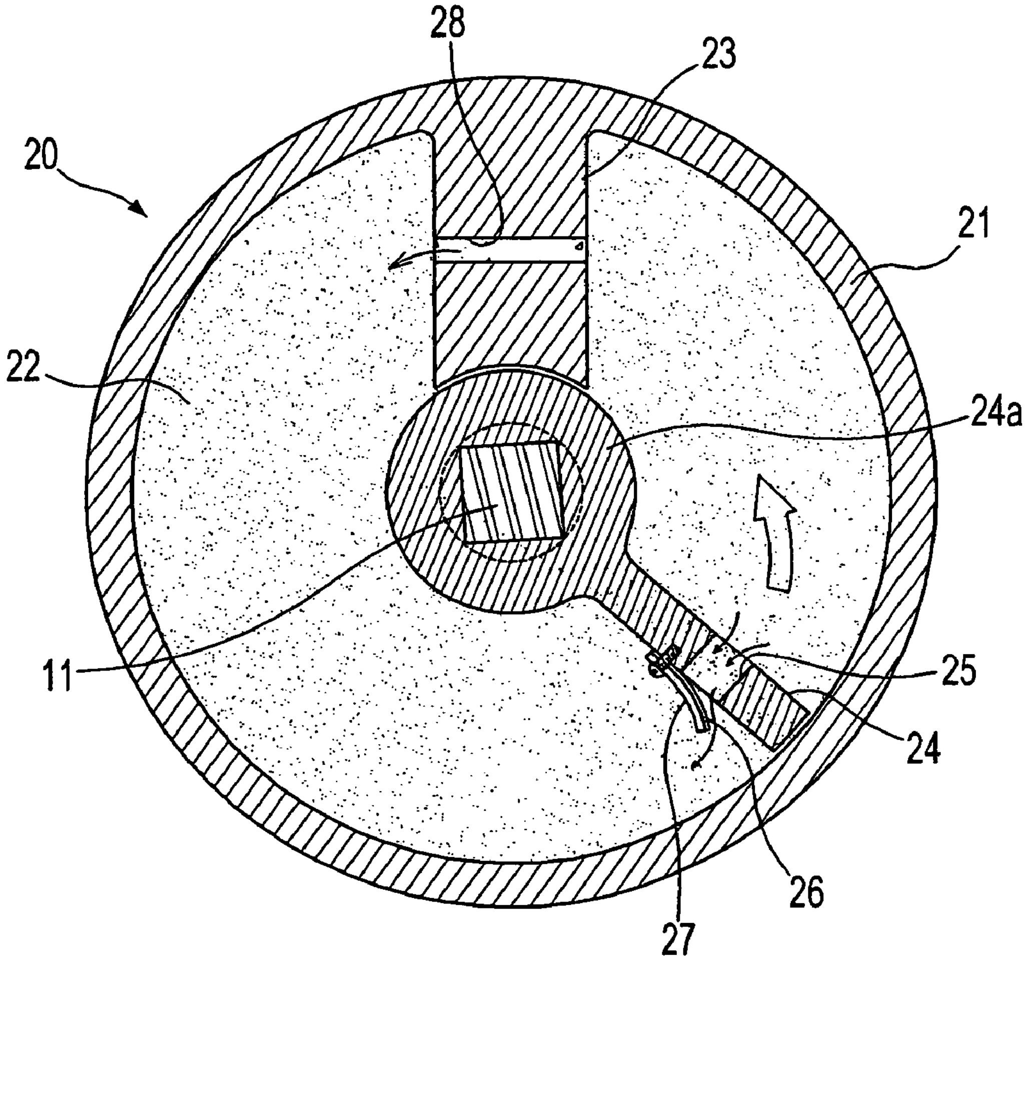
FIG. 5 is a cross-sectional view taken along line D-D' of FIG. 3, illustrating the rotating resistance unit while a door is closed.

With this construction, when the compressing plate 24 is rotated in an opening direction of the door 3 (clockwise direction) as shown in FIG. 4, the opening/closing member 26 closes the first flow hole 25, so that rotating resistance is generated to the rotational shaft 11. On the other hand, when the compressing plate 24 is rotated in a closing direction of the door (counterclockwise direction) as shown in FIG. 5, the opening/closing member 26 is pushed by pressure of the fluid passing through the first flow hole 25, and opens the first flow hole 25, so that rotating resistance is hardly applied to the rotational shaft 11. That is, when the first flow hole 25 is opened, the fluid passes through the first flow hole 25, so that rotating resistance is hardly applied to the rotational shaft 11. Thus, the rotational shaft 11 can be easily rotated in the closing direction of the door 3.

In FIG. 4, the shielding plate 23 of the rotating resistance unit 20 is formed with a second flow hole 28. The second flow hole 28 is provided for the purpose of enabling a predetermined amount of fluid to always flow through the shielding plate 23 even when the fluid is compressed by rotation of the rotational shaft 11 in the opening direction of the door 3 (in the clockwise direction). Meanwhile, the second flow hole 28 is smaller than the first flow hole 25 to generate flow resistance when the fluid passes through the second flow hole 28. As a result, when the viscous fluid is compressed by the compressing plate 24, a rotational load is applied to the rotational shaft 11 by flow resistance of the viscous fluid passing through the second flow hole 28, so that the rotational shaft 11 is slowly rotated to relieve the impact occurring when the door 3 is opened.

Although the first flow hole 25 and the opening/closing member 26 are formed in the compressing plate 24 and the second flow hole 28 is formed in the shielding plate 23 in the rotating resistance unit 20 of FIG. 4, it should be noted that the present invention is not limited to this construction. Instead, although not shown in the drawings, the first flow hole and the opening/closing member may be formed in the shielding plate, and the second flow hole is formed in the compressing plate 24 without any limitation in functions. Additionally, the first flow hole, the opening/closing member, and the second flow hole may be formed in the shielding plate with the same functions. Furthermore, as long as a predetermined amount of fluid can flow through a gap between the compressing plate and an inner surface of the casing, the above functions can be realized without forming the second flow hole in the shielding plate.

Meanwhile, the latching device 30 serving to allow the rotational shaft 11 and the door 3 to rotate together when the door 3 is hinged includes a latching protrusion 31 protruding from an outer surface of the rotational shaft 11, and a latching groove 32 formed to the bracket 12 of the door 3 to receive the latching protrusion 31 such that the latching protrusion 31 is latched thereto. The latching groove 32 is defined as a groove between a first latching jaw 33 and a second latching jaw 34 separated from each other in the rotating direction and formed on the outer surface of the bracket 12 adjacent the shaft engaging hole 13. As a result, the latching protrusion 31 of the rotational shaft 11 is located in the latching groove 32 between the first and second latching jaws 33 and 34 so that the latching protrusion 31 is latched to the first latching jaw 33 or to the second latching jaw 34, and is prevented from rotating.

Figure 6:
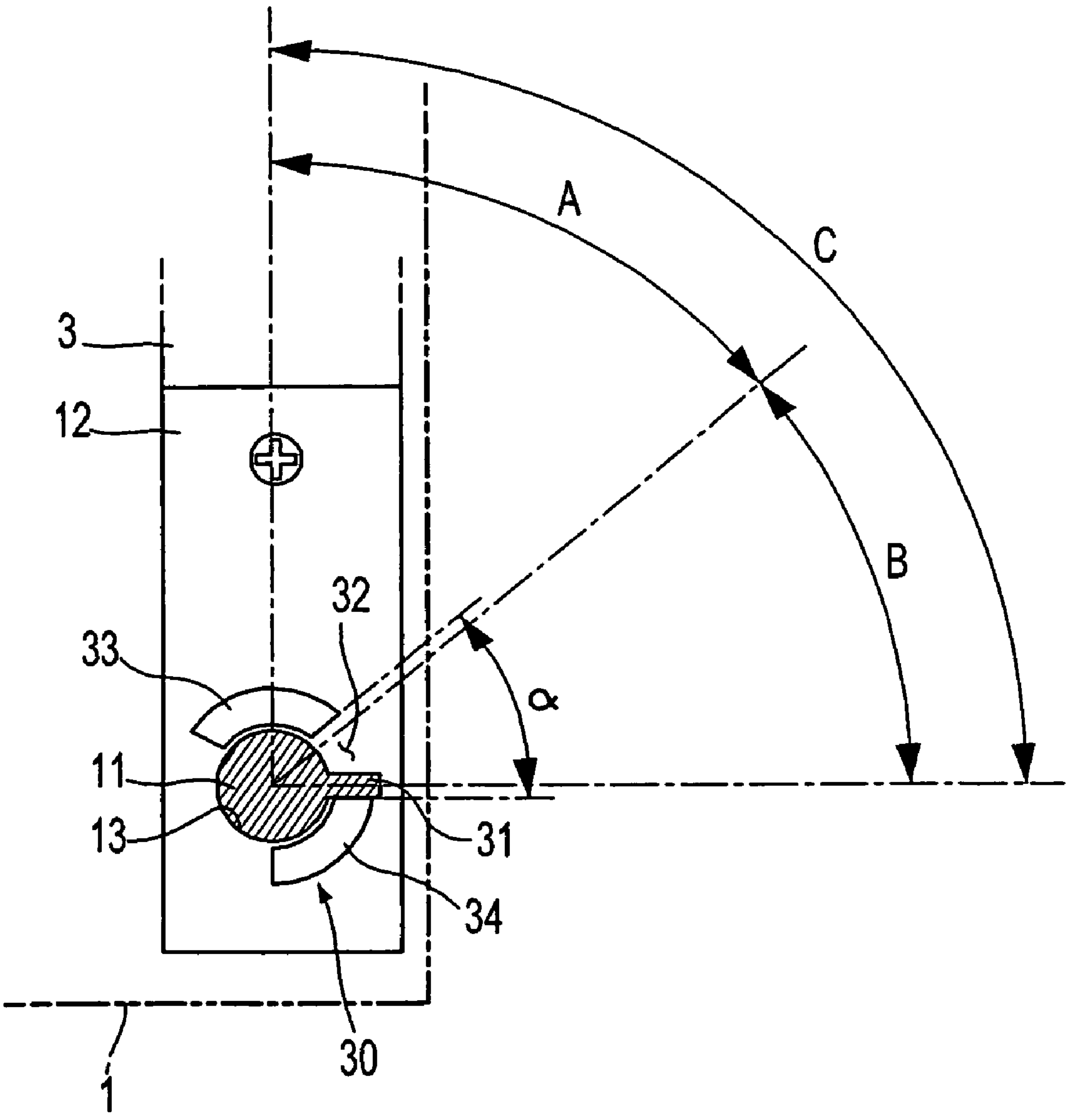
FIG. 6 is a cross-sectional view taken along line F-F' of FIG. 3, illustrating the state of the door being completely closed.
Figure 7:
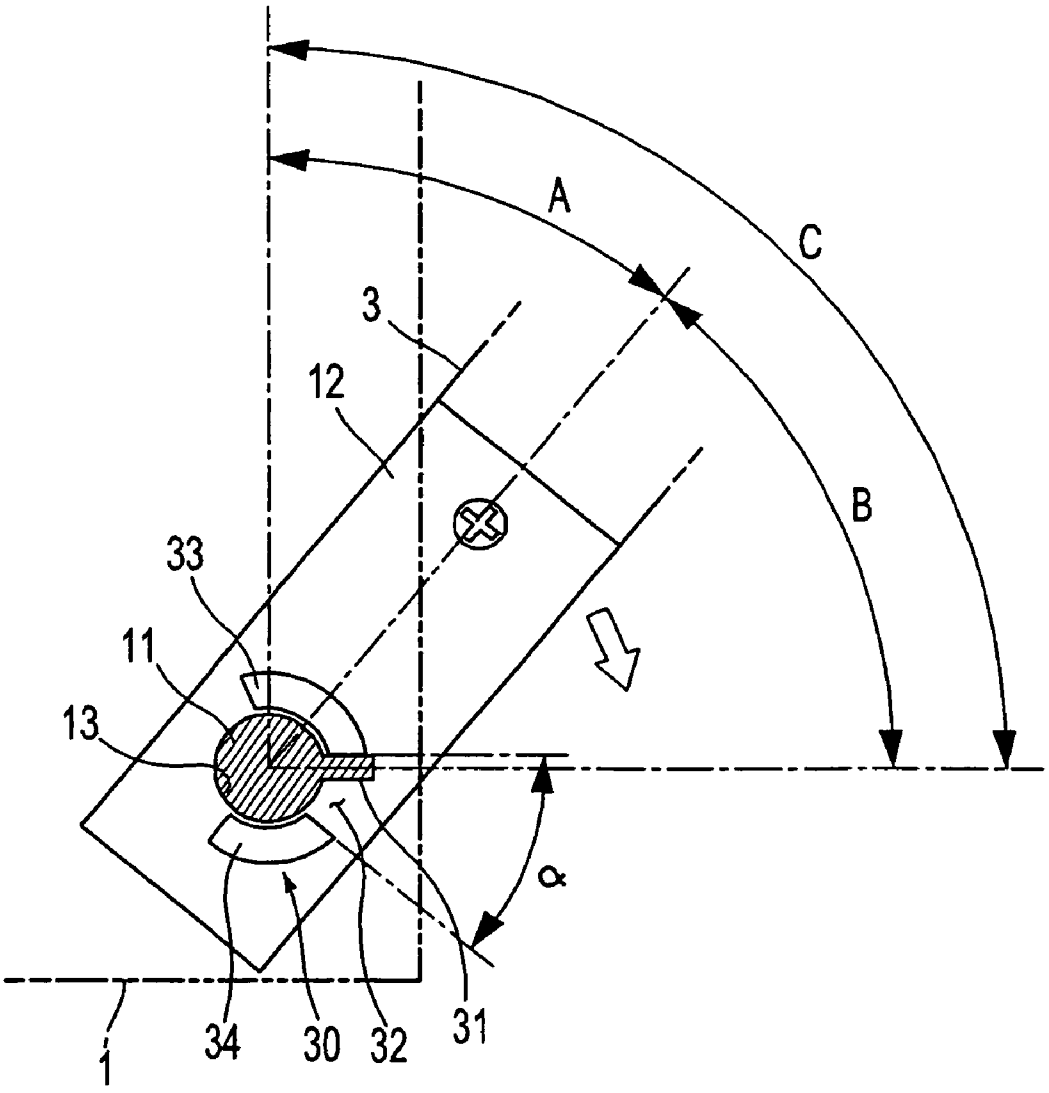
FIG. 7 is a cross-sectional view taken along line F-F' of FIG. 3, illustrating the state of the door being partially opened in a predetermined region.

As shown in FIGS. 6 and 7, the latching device 30 includes a free rotating section A enabling free rotation of the door 3 at an initial stage of opening the door 3 to allow the door 3 to be easily opened, and a latching section B allowing the latching device 30 to be latched to the rotational shaft 11 and the door 3 at a final stage of opening the door 3 to allow the rotational shaft 11 and the door 3 to be rotated together. The free rotating section A is a section where the latching protrusion 31 of the rotational shaft 11 is not latched to the latching jaws 33 and 34 at both sides of the latching groove 32 so that the door 3 is freely rotated without rotation of the rotational shaft 11, and the latching section B is a section where the latching protrusion 31 is latched to the latching groove 32 so that the door 3 is rotated together with the rotational shaft 11. Accordingly, at the free rotating section A, the door 3 is not subjected to rotating resistance so that the door 3 is easily opened, whereas, at the latching section B, the door 3 is subjected to the rotating resistance and relieved in impact so that the door 3 is slowly opened. This is because, when the rotational shaft 11 is rotated in the opening direction of the door 3, the rotational shaft 11 is subjected to rotating resistance by virtue of operation of the rotating resistance unit 20.

In order to enable the operation of the rotating resistance unit 20 as described above, the latching groove 23 must have a width corresponding to a rotating angle of the free rotating section A in the rotating direction. In other words, as shown in FIG. 6, a rotating angle $\alpha$ of the latching groove 32 is the same as that of the free rotating section A.

In the embodiment shown in FIG. 6, the free rotating section A has a rotating angle of about 45°. However, it should be noted that the free rotating section A is not limited to this construction, and that it can be suitably changed with the weight or the dimensions of the door 3 taken into consideration such that the door can be more smoothly opened or closed. With regard to this, the range of the free rotating section A must be less than an angle C (maximum opening angle) at which the door 13 can be maximally opened, to present the latching section B for relieving the impact to the door 3 at the final stage of opening the door 3.

Operation of the door damper of the invention will be described as follows.

As shown in FIG. 6, with the door 3 closed, the latching protrusion 31 of the rotational shaft 11 is latched to the second latching jaw 34 defining a lower portion of the latching groove 32. In this state, if the door 3 is opened, the latching protrusion 31 of the rotational shaft 11 is located within the latching groove 32 at an initial stage of opening the door 3, so that the rotational shaft 11 is not rotated. That is, since the rotating angle $\alpha$ of the free rotating section A is the same as that of the latching groove 32, the door 3 is freely rotated.

Figure 8:
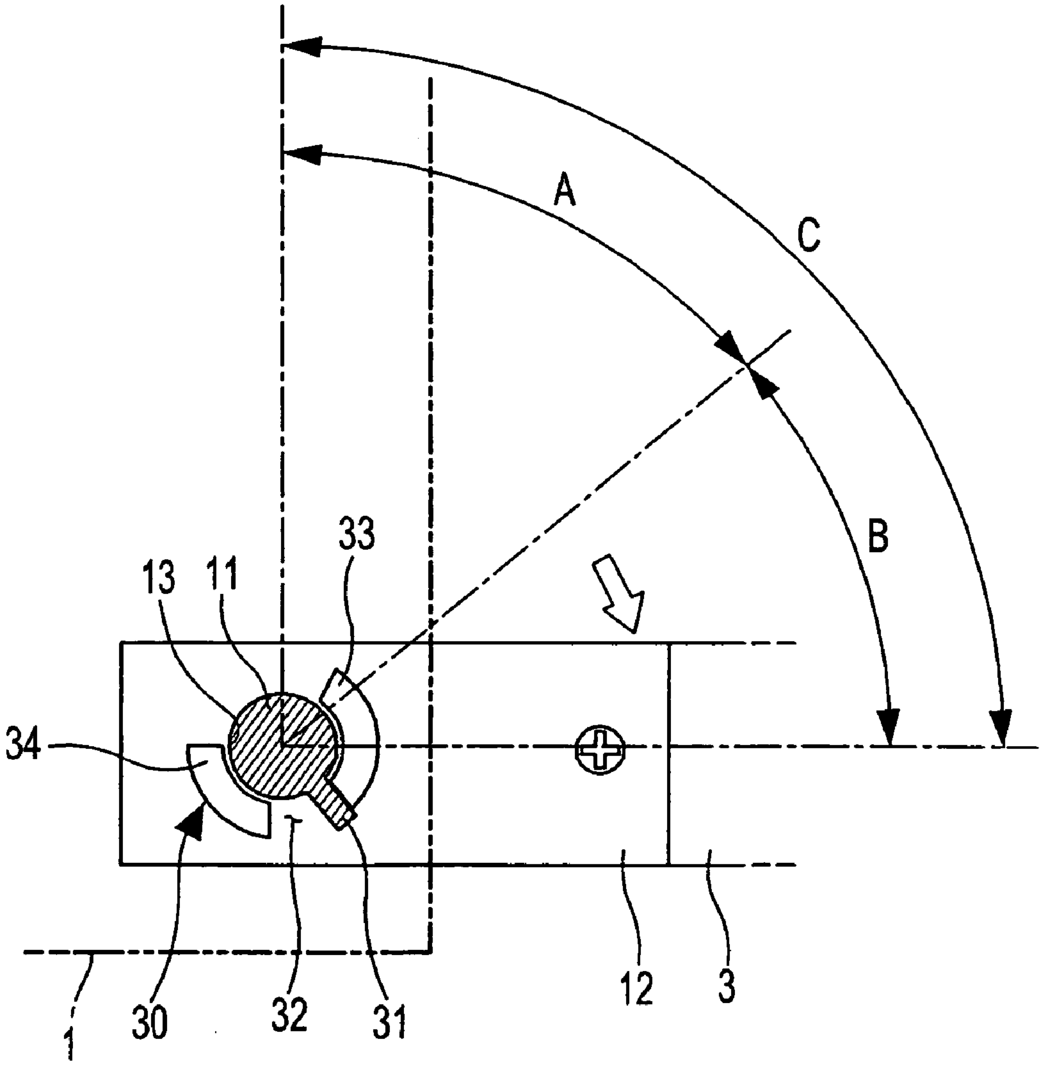
FIG. 8 is a cross-sectional view taken along line F-F' of FIG. 3, illustrating the state of the door being completely opened.

If the door 3 is further rotated from the state shown in FIG. 7 to the state shown in FIG. 8, the latching protrusion 31 of the rotational shaft 11 is latched to the first latching jaw 33 defining an upper portion of the latching groove 32, so that the rotational shaft 11 rotates together with the door 3. Additionally, as shown in FIG. 4, since the first flow hole of the rotating resistance unit 20 is closed by the opening and closing member 26, the rotational shaft 11 is subjected to the rotating resistance. Accordingly, at the final stage of opening the door 3, the door 3 is in the latching section B, and thus the door 3 is slowly opened while being dampened. This behavior continues until the door 3 is completely opened.

Figure 9:
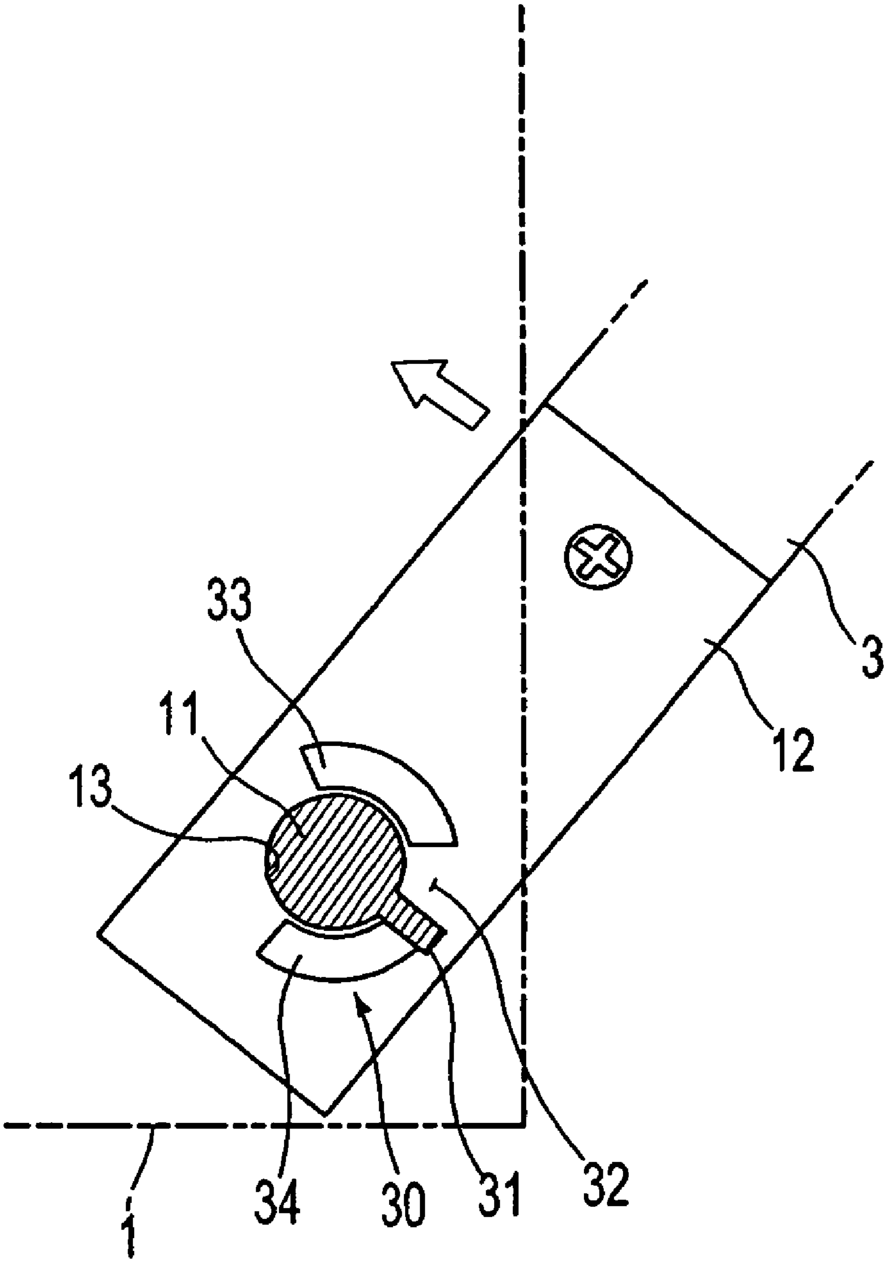
FIG. 9 is a cross-sectional view taken along line F-F' of FIG. 3, illustrating the state of the door being completely opened and then partially closed in a predetermined region.

If the door 3 is closed from the state shown in FIG. 8, the latching protrusion 31 of the rotational shaft 11 is not latched to the latching groove 32 as shown in FIG. 9, so that the door 3 may be closed while freely rotating in the predetermined region. Additionally, if the door 3 is further closed from the stage shown in FIG. 9, the latching protrusion 31 of the rotational shaft 11 is latched to the second latching jaw 34 defining the lower portion of the latching groove 32, so that the rotational shaft 11 is rotated together with the door 3 in a closing direction of the door. At this time, when the rotational shaft 11 is rotated in the closing direction of the door 3, the first flow hole 28 of the rotating resistance unit 20 is opened as shown in FIG. 5, so that the rotational shaft 11 is not subjected to the rotational resistance. Accordingly, when closing the door 3, the door 3 is not subjected to the rotational resistance in every section, the door 3 can be easily closed. Then, after the door 3 is completely closed, the door is in the initial stage as shown in FIG. 5.

Figure 10:
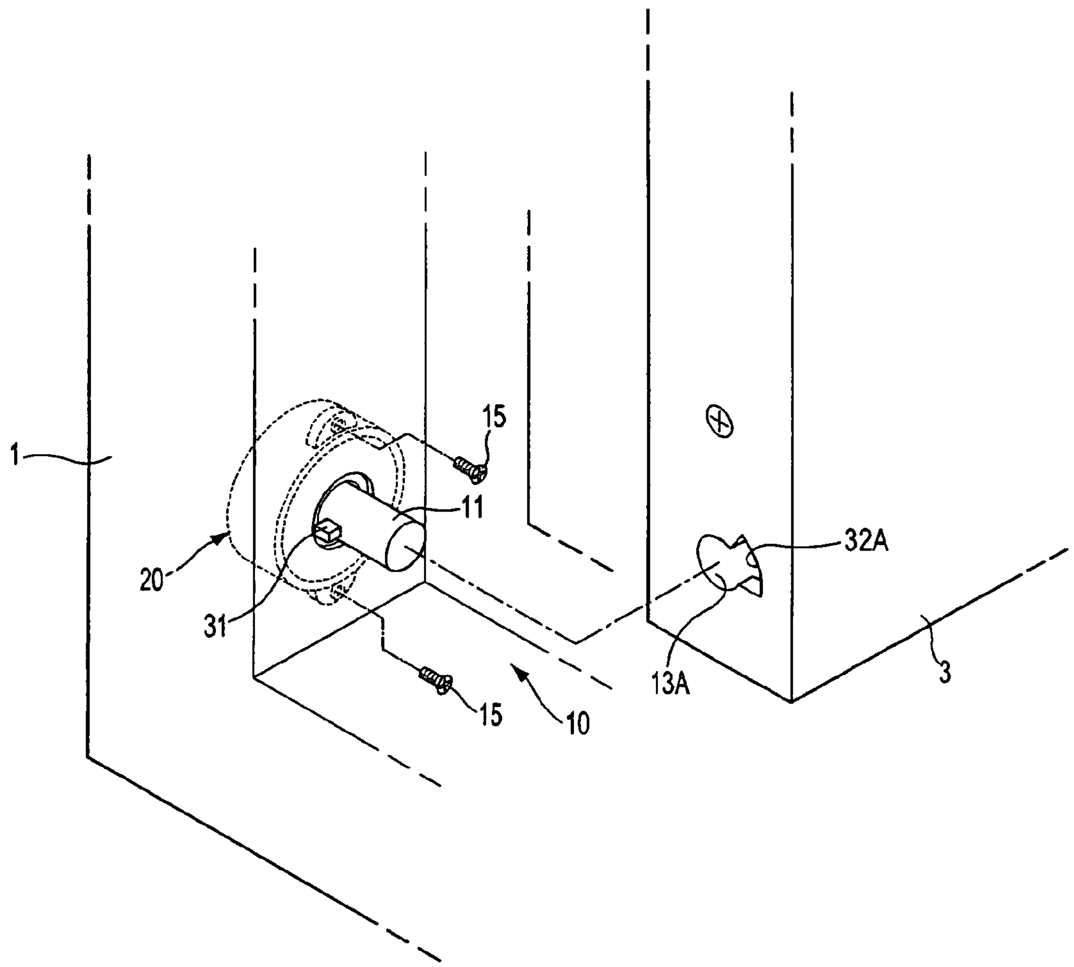
FIGS. 10 and 11 show door dampers in accordance with other embodiments of the present invention.
Figure 11:
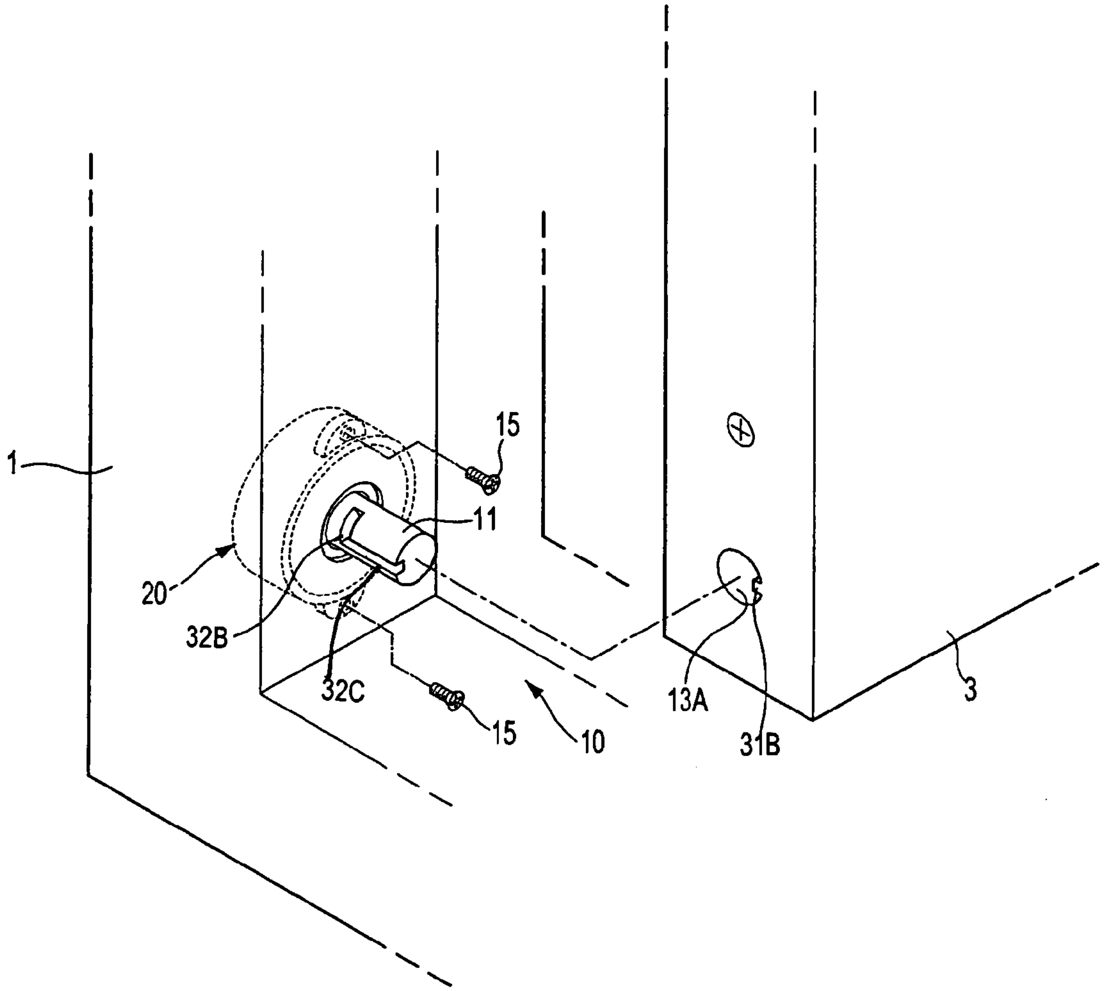

FIGS. 10 and 11 show door dampers in accordance with other embodiments of the present invention.

In the embodiment of FIG. 10, a shaft engaging hole 13A engaging with a rotational shaft 11 is directly formed on the door 3, and a latching groove 32A latched by a latching protrusion 31 is formed on an inner surface of the shaft engaging hole 13A. That is, this embodiment of the door damper does not have a bracket mounted to the door 3, and thus has the shaft engaging hole 13A directly formed on the door 3.

In the embodiment of FIG. 11, a latching groove 32B is formed on an outer surface of the rotational shaft 11, and a latching protrusion 31B is formed on an inner surface of the shaft engaging hole 13A. Additionally, since the latching protrusion 31B formed on an inner surface of the shaft engaging hole 13A must enter the latching groove 32A of the rotational shaft 11, an entrance groove 32C is formed on an outer surface of the rotational shaft 11. Although these embodiments are slightly changed in construction of the latching device 30, the latching device of these embodiments can perform the same functions as those of the latching device described above.

One of the advantages of the present invention is that the door damper can generate rotating resistance applied to the door in the free rotation section where the door is located at an initial stage of opening the door while preventing the rotating resistance from being applied to the door in the latching section where the door is located at a final stage of closing the door, so that the door can be smoothly opened while preventing impact occurring to the door.

Another advantage of the present invention is that the door damper prevents rotating resistance from being applied to the door when the door is closed, so that the door of electronic appliances can be easily closed.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A door damper to relieve impact occurring when a door is opened, comprising:

a rotational shaft rotatably coupled to the door;

a rotating resistance unit to generate rotating resistance to the rotational shaft;

a latching device latched to the rotational shaft and the door so as to allow the door and the rotational shaft to rotate together in a predetermined region, the latching device having a free rotating section enabling free rotation of the door at an initial stage of opening the door and a latching section enabling the latching device to be latched to the rotational shaft and the door at a final stage of opening the door so as to allow the door and the rotational shaft to rotate together, wherein the latching device comprises a latching protrusion protruding from an outer surface of the rotational shaft, and a latching groove formed on the door to allow the latching protrusion to enter the latching groove and latch to the latching groove, and having a width corresponding to the free rotating section in a rotating direction to allow the free rotation of the door; and a bracket coupled to an end of the door and having a shaft engaging hole to engage with the rotational shaft, and a plurality of latching jaws adjacent the shaft engaging hole and formed on an outer surface of the bracket to latch to the latching protrusion, the latching groove having a width corresponding to a separation between the latching jaws.

2. The door damper according to claim 1, wherein the rotating resistance unit comprises a cylindrical casing filled with viscous fluid and having the rotational shaft rotatably coupled to a center of the casing, a shielding plate fixed into the casing to radially partition an inner space of the casing, and a compressing plate fixed to the rotational shaft to compress the viscous fluid in the casing while rotating together with the rotational shaft, and extending in a radial direction of the rotational shaft.

3. The door damper according to claim 2, further comprising: a first flow hole formed in at least one of the shielding plate and the compressing plate to allow the fluid to flow therethrough, and an opening/closing member to open or close the first flow hole so as to allow the free rotation when the rotational shaft rotates in a closing direction of the door while generating rotating resistance to the rotational shaft when the rotational shaft rotates in an opening direction of the door.

4. The door damper according to claim 3, further comprising: a second flow hole formed in at least one of the shielding plate and the compressing plate to allow the fluid to flow therethrough.

5. An electronic appliance comprising a body having a receiving compartment defined therein, a door to open or close the receiving compartment, and a door damper to relieve impact when the door is opened, wherein the door damper comprises:

a rotational shaft rotatably coupled to the door;

a rotating resistance unit to generate rotating resistance to the rotational shaft; and a latching device latched to the rotational shaft and the door so as to allow the door and the rotational shaft to rotate together in a predetermined region, the latching device having a free rotating section enabling free rotation of the door at an initial stage of opening the door and a latching section enabling the latching device to be latched to the rotational shaft and the door at a final stage of opening the door so as to allow the door and the rotational shaft to rotate together, wherein the latching device comprises a latching protrusion protruding from an outer surface of the rotational shaft, and a latching groove formed on the door to allow the latching protrusion to enter the latching groove and latch to the latching groove, and having a width corresponding to the free rotating section in a rotating direction to allow the free rotation of the door, and the latching groove is formed on an inner surface of the shaft engaging hole formed to the door to engage with the rotational shaft.

6. The electronic appliance according to claim 5, wherein the rotating resistance unit comprises a cylindrical casing filled with viscous fluid and having the rotational shaft rotatably coupled to a center of the casing, a shielding plate fixed into the casing to radially partition an inner space of the casing, and a compressing plate fixed to the rotational shaft to compress the viscous fluid in the casing while rotating together with the rotational shaft, and extending in a radial direction of the rotational shaft.

7. The electronic appliance according to claim 6, further comprising: a first flow hole formed in at least one of the shielding plate and the compressing plate to allow the fluid to flow therethrough, and an opening/closing member to open or close the first flow hole so as to allow the free rotation when the rotational shaft rotates in a closing direction of the door while generating rotating resistance to the rotational shaft when the rotational shaft rotates in an opening direction of the door.

8. A door damper to relieve impact occurring when a door is opened, comprising:

a rotational shaft rotatably coupled to the door;

a rotating resistance unit to generate rotating resistance to the rotational shaft; and a latching device latched to the rotational shaft and the door so as to allow the door and the rotational shaft to rotate together in a predetermined region, the latching device having a free rotating section enabling free rotation of the door at an initial stage of opening the door and a latching section enabling the latching device to be latched to the rotational shaft and the door at a final stage of opening the door so as to allow the door and the rotational shaft to rotate together, wherein the latching device comprises a latching protrusion protruding from an outer surface of the rotational shaft, and a latching groove formed on the door to allow the latching protrusion to enter the latching groove and latch to the latching groove, and having a width corresponding to the free rotating section in a rotating direction to allow the free rotation of the door, and the latching groove is formed on an inner surface of the shaft engaging hole formed to the door to engage with the rotational shaft.

* * * * *